(12) United States Patent
Yonemoto et al.

(10) Patent No.: US 6,980,244 B1
(45) Date of Patent: Dec. 27, 2005

(54) SOLID STATE IMAGE PICKUP DEVICE, DRIVING METHOD THEREOF AND CAMERA

(75) Inventors: Kazuya Yonemoto, Tokyo (JP); Takahisa Ueno, Kanagawa (JP); Ryoji Suzuki, Kanagawa (JP); Koichi Shiono, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/252,690

(22) Filed: Feb. 22, 1999

(30) Foreign Application Priority Data

Feb. 24, 1998 (JP) ............................... P10-042514

(51) Int. Cl.[7] .......................... H04N 3/14; H04N 5/335
(52) U.S. Cl. ...................... 348/302; 348/304; 348/305; 348/308; 348/310
(58) Field of Search ............................... 348/302, 304, 348/305, 308, 310

(56) References Cited

U.S. PATENT DOCUMENTS

| | | | | |
|---|---|---|---|---|
| 4,067,046 A | * | 1/1978 | Nakatani et al. ............. 348/308 |
| 4,835,617 A | * | 5/1989 | Todaka et al. ............... 348/296 |
| 4,870,493 A | * | 9/1989 | Izawa et al. ................. 348/305 |
| 4,954,895 A | * | 9/1990 | Akimoto et al. ............. 348/301 |
| 5,115,293 A | * | 5/1992 | Murayama et al. .......... 257/292 |
| 5,336,879 A | * | 8/1994 | Sauer ....................... 250/208.1 |
| 6,449,014 B1 | * | 9/2002 | Throngnumchai .......... 348/308 |

FOREIGN PATENT DOCUMENTS

| | | |
|---|---|---|
| EP | 0 569 202 A2 | 4/1993 |
| EP | 0 862 321 A2 | 10/1997 |
| GB | 2 318 473 | 10/1997 |

* cited by examiner

Primary Examiner—Thai Tran
Assistant Examiner—James M. Hannett
(74) Attorney, Agent, or Firm—Robert J. Depke; Trexler, Bushnell, Giangiorgi, Blackstone & Marr, Ltd.

(57) ABSTRACT

There are provided a solid state image pickup device in which the accumulation time of each pixel when an electronic shutter operation is performed is constant, and a high shutter speed can be set, a driving method therefor, and a camera.

A solid state image pickup device (20) having means 3, 4, 7, and 11 which simultaneously perform reading operation of one row and an electronic shutter operation for the other row in a one-pixel period P is constituted.

15 Claims, 10 Drawing Sheets

FIG. 1   PRIOR ART

PRIOR ART

SOLID STATE IMAGE PICKUP DEVICE, DRIVING METHOD THEREOF AND CAMERA

RELATED APPLICATION DATA

The present application claims priority to Japanese Application No. P10 042514 filed Feb. 24, 1998 which application is incorporated herein by reference to the extent permitted by law.

BACKGROUND OF THE INVENTION

1. Field of the Invention

The present invention relates to a solid state image pickup device constituted by an image pickup element in which pixels are arranged in, e.g., the form of a matrix, a driving method therefor, and a camera comprising an optical system and a solid state image pickup device.

2. Description of the Related Art

As a solid state image pickup device, there is a solid state image pickup device constituted by a so-called MOS type or CMOS type image pickup element in which each unit pixel is constituted by a having MOS transistor, a signal charge accumulated on a pixel is read by photoelectric conversion, and the signal charge is converted into a voltage to output the voltage.

In the MOS type or CMOS type image pickup element, for example, a MOS transistor is used as a switching element for selecting a pixel and a switching element for reading a signal charge.

A MOS transistor or a CMOS transistor is used in a horizontal scanning circuit or a vertical scanning circuit, and can be advantageously manufactured with an arrangement in series with a switching element.

In a conventional so-called X-Y address type MOS or CMOS image pickup element in which unit pixels are secondarily arranged in row and column in a two-dimensional fashion in order to perform an electronic shutter, unnecessary signal charges are reset (exhausted) from pixels of one row to a signal line in a horizontal blanking period in which signal charges are not read.

Figure 1:
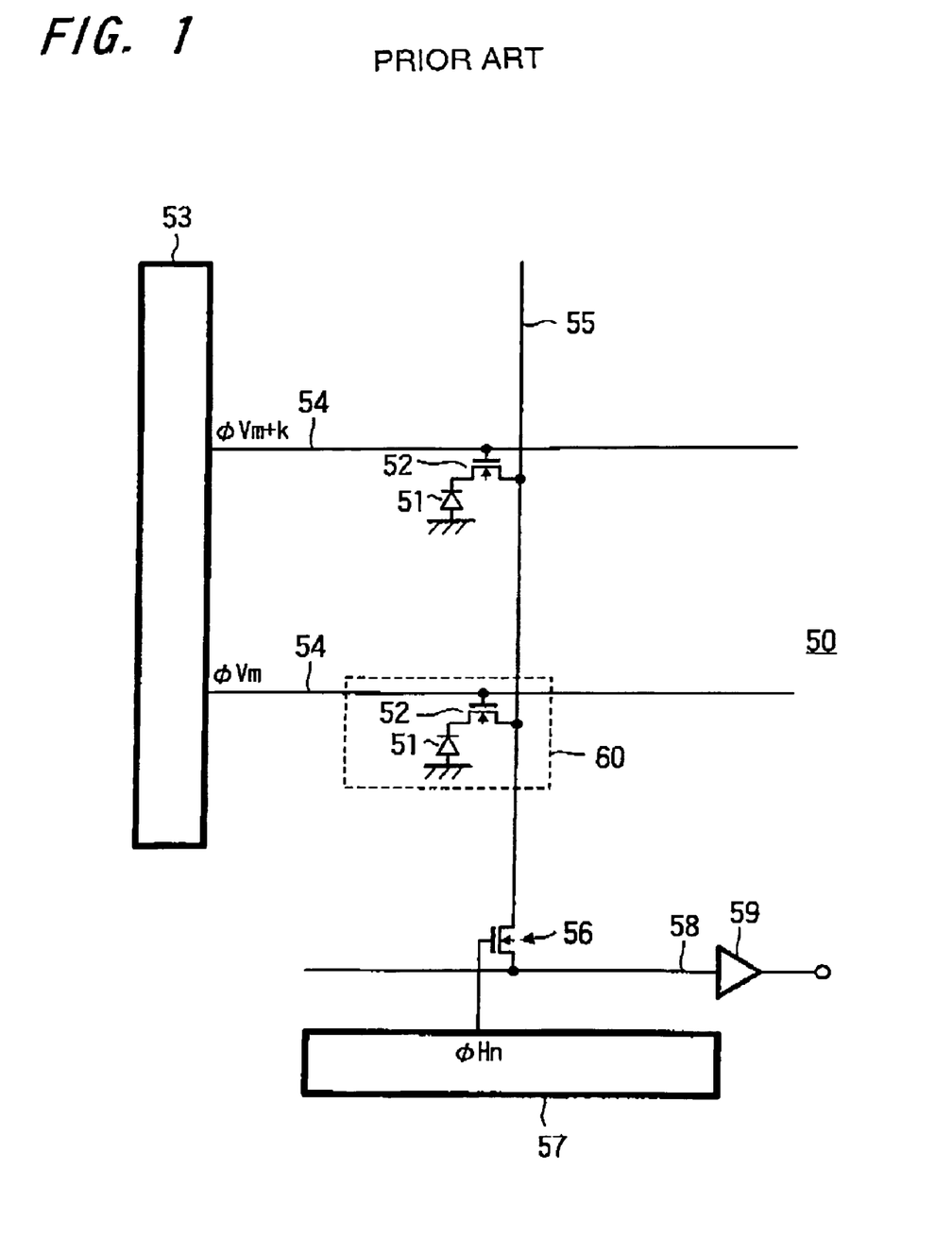
FIG. 1 is a schematic view showing the arrangement of the circuit of a conventional MOS type solid state image pickup device.

FIG. 1 is a schematic view showing the arrangement of a conventional solid state image pickup device having a CMOS image pickup element.

This solid state image pickup device 50 is constituted by an image pickup region formed by arranging a plurality of unit pixels 60, each of which is constituted by a photodiode 51 for performing photoelectric conversion and a vertical selection switch 52 for selecting a pixel, in the form of a matrix, a vertical scanning circuit 53 for outputting a vertical scanning pulse φVm to a vertical selection line 54 to which control electrodes of the vertical selection switches 52 are commonly connected at each row, a vertical signal line 55 to which main electrodes of the vertical selection switches 52 of each column are commonly connected at each row, a horizontal switch 56 connected to the vertical signal line 55 and a horizontal signal line 58, a horizontal scanning circuit 57 connected to the control electrode of the horizontal switch 56, and an amplifier 59 connected to the horizontal signal line 58.

As a basic operation of the solid state image pickup device 50, a signal charge photoelectrically converted by the photodiode 51 is read to the vertical signal line 55 through the vertical selection switch 52 controlled by the vertical scanning circuit 53. In a horizontal video period $H_A$, the signal charge read to the vertical signal line 55 is sequentially output to the horizontal signal line 58 through the horizontal switch 56 controlled by the horizontal scanning circuit 57, and is converted into a signal voltage by the amplifier 59 connected to the horizontal signal line 58 to output the signal voltage.

In the conventional solid state image pickup device 50, when an electronic shutter operation is to be performed, the vertical signal line 55 is also used to exhaust an unnecessary signal charge. For this reason, in a horizontal blanking period $H_{BLK}$ in which no signal is output, the unnecessary signal charges are exhausted.

Figure 2:
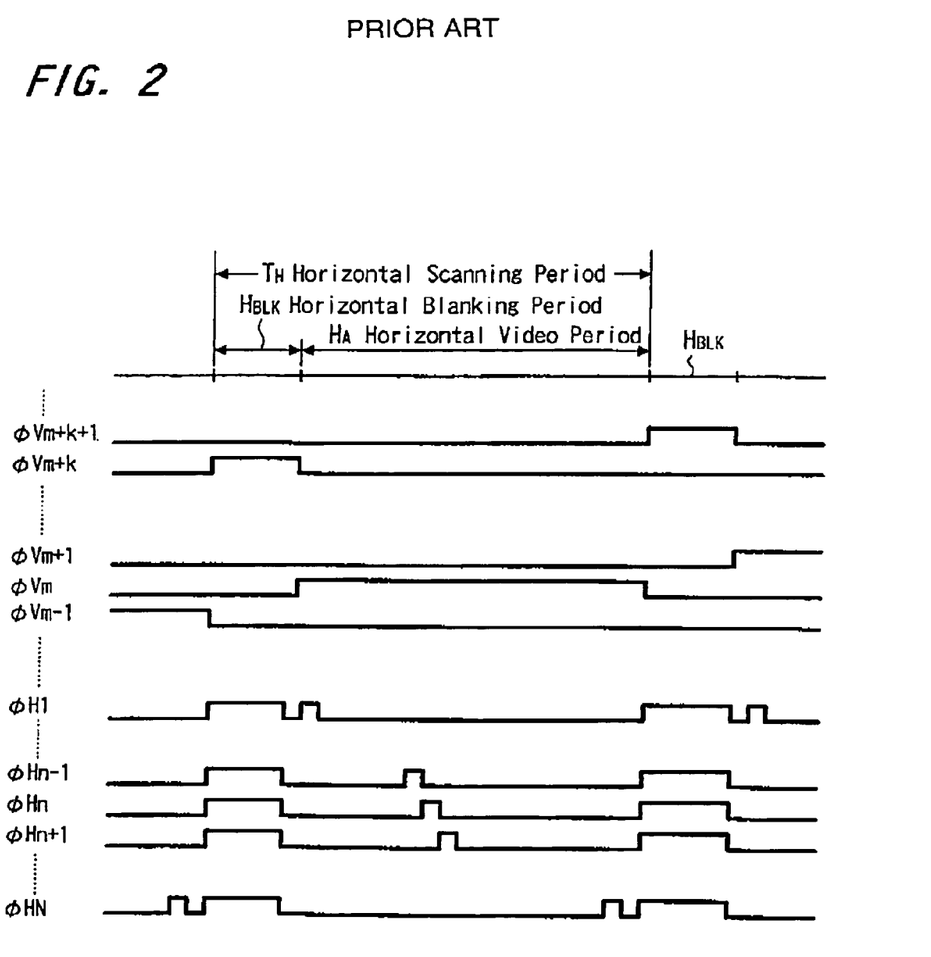
FIG. 2 is a timing chart of operation timings in the solid state image pickup device in FIG. 1.

At this time, at a timing shown in FIG. 2, a vertical scanning pulse φVm+k of the vertical selection line 54 at an(m+k)th row rises in the horizontal blanking period $H_{BLK}$ in a certain horizontal scanning period $T_H$, and signal charges are exhausted from the photodiodes 51 of the corresponding row.

On the other hand, a vertical scanning pulse φVm of the mth row rises in a horizontal video period $H_A$ of the same horizontal scanning period TH, signal charges are read from the photodiodes 51 to the vertical signal line 55, and a signal is output from the solid state image pickup device 50.

By the way, a shutter speed of an electronic shutter, i.e., a time corresponding to the accumulation time of a pixel is determined by a time from an exhaust time of signal charges to a read time of a signal charge. For this reason, when a horizontal scanning period, a horizontal blanking period, and the number of horizontal pixels are represented by $T_H$, $H_{BLK}$, and N, respectively, the accumulation time of a pixel at one end in the horizontal direction output by a horizontal scanning pulse φH1 is $k \times T_H$, and the accumulation time of a pixel at the other end in the horizontal direction output by a horizontal scanning pulse φHN is $k \times T_H + (T_H - H_{BLK})$. As a result, the accumulation times of the pixels on the right and left sides in the horizontal direction are different from each other.

More specifically, the accumulation time of a pixel output by a horizontal scanning pulse φHn changes in proportion to a timing at which that pulse is output.

When an electronic shutter operation is performed in a conventional solid state image pickup device as described above, unnecessary charges are simultaneously exhausted in the respective rows, reading of the signal charge are sequentially performed according to scanning, and the accumulation times in the respective rows change in the range of $k \times T_H$ to $k \times T_H + (T_H - H_{BLK})$. This change especially, adversely affects a solid state image pickup device in which a shutter speed is set to be high and the value of k is small.

As described above, in a conventional solid state image pickup device, with respect to a pixel row which is reset in the horizontal blanking period $H_{BLK}$, the accumulation time of a pixel read first by the horizontal scanning is different from the accumulation time of a pixel finally read by the horizontal scanning. The difference between the accumulation times is almost a time corresponding to a horizontal scanning period.

When the accumulation time of the pixel, i.e., a shutter speeds is sufficiently long, the difference between the accumulation times described above can be neglected. However, when the shutter speed becomes as long as the horizontal scanning period, the difference between the accumulation times appears as shading in a line direction (row direction).

SUMMARY OF THE INVENTION

In order to solve the problem described above, according to the present invention, there are provided a solid state image pickup device in which the accumulation time of each pixel is constant when an electronic shutter operation is performed, and a high shutter speed can be set, a driving method therefor, and a camera.

A solid state image pickup device according to the present invention has a means for simultaneously performing reading of one row and an electronic shutter for the other row in a one-pixel signal period.

A driving method for a solid state image pickup device according to the present invention simultaneously performs reading of one row and an electronic shutter for the other row in a one-pixel signal period.

A camera according to the present invention comprises an optical system and a solid state image pickup device having a means for simultaneously performing reading of one row and an electronic shutter for the other row in a one-pixel signal period.

According to the solid state image pickup device of the present invention, by providing the means for simultaneously performing reading of one row and an electronic shutter for the other row in a one-pixel signal period, a solid state image pickup device in which a time of exhaustion of unnecessary charges, i.e., from resetting to reading of a charge, i.e., an accumulation time of signal charge is constant can be constituted.

According to the driving method for a solid state image pickup device of the present invention, by simultaneously performing reading of one row and an electronic shutter for the other row in a one-pixel signal period, an accumulation time of signal charges can be made constant.

According to the camera of the present invention, by providing an optical system and a solid state image pickup device having a means for simultaneously performing reading of one row and an electronic shutter for the other row in a one-pixel signal period, a camera in which an accumulation time of each pixel is constant can be formed.

DESCRIPTION OF THE PREFERRED EMBODIMENTS

The present invention is a solid state image pickup device having a means for simultaneously performing reading of one row and an electronic shutter for the other row in a one-pixel signal period.

Further, according to the present invention, in the above-mentioned solid state image pickup device, reading of a pixel in one column in the row and an electronic shutter for a pixel in the one row in the other are row performed.

Also, according to the present invention, in the above-described solid state image pickup device, reading of a pixel in one column in one row and an electronic shutter for a pixel in a column adjacent to the one column in the other row are performed.

According to the present invention, in the above-said solid state image pickup device, the solid state image pickup device is an X-Y address type MOS or CMOS solid state image pickup device, and a read scanning pulse and an electronic shutter scanning pulse are output from both of a horizontal scanning circuit and a vertical scanning circuit constituting the above means.

According to the present invention, in the solid state image pickup device described above, one pulse rises for each pixel as the read scanning pulse, one pulse rises for each pixel as the electronic shutter scanning pulse, and one of the read scanning pulse and the electronic shutter scanning pulse is output at a timing at which phases of the read scanning pulse and the electronic shutter scanning pulse do not overlap.

According to the present invention, in the solid state image pickup device described above, the solid state image pickup device is an X-Y address type MOS or CMOS solid state image pickup device, and has a pixel arrangement in which a vertical selection switch for performing an operation of reading a signal charge of a pixel to a signal line is controlled by a product between a vertical scanning pulse and a horizontal read pulse, a charge detection amplifier for converting the read signal charge into a voltage is connected to the signal line, and a read scanning pulse and an electronic shutter scanning pulse are output from both of a horizontal scanning circuit and a vertical scanning circuit constituting the above-mentioned means.

According to the present invention, in the solid state image pickup device described above, one pulse rises for each pixel as the read scanning pulse, one pulse rises for each pixel as the electronic shutter scanning pulse, and one of the read scanning pulse and the electronic shutter scanning pulse is output at a timing at which phases of the read scanning pulse and the electronic shutter scanning pulse do not overlap.

The present invention is a driving method for a solid state image pickup device which simultaneously performs reading of one row and an electronic shutter for the other row are simultaneously performed in a one-pixel signal period.

According to the present invention, in the above-mentioned driving method for a solid state image pickup device, reading of a pixel in one column in one row and an electronic shutter for a pixel in one column in the other row are performed.

According to the present invention, in the driving method for a solid state image pickup device described above, reading of a pixel in one column in the one row and an electronic shutter for a pixel in a column adjacent to the one column in the other row are performed.

According to the present invention, in the driving method for a solid state image pickup device described above, to an X-Y address type MOS or CMOS solid state image pickup device, a read scanning pulse and an electronic shutter scanning pulse are output from both of a horizontal scanning circuit and a vertical scanning circuit.

According to the present invention, in the driving method for a solid state image pickup device mentioned above, one pulse is raised for each pixel as the read scanning pulse, one pulse is raised for each pixel as the electronic shutter scanning pulse, and one of the read scanning pulse and the electronic shutter scanning pulse is output at a timing at which phases of the read scanning pulse and the electronic shutter scanning pulse do not overlap.

According to the present invention, in the above-mentioned driving method for a solid state image pickup device, to an X-Y address type MOS or CMOS solid state image pickup device, a vertical selection switch for performing an operation of reading a signal charge of a pixel to a signal line is controlled by a product between a vertical scanning pulse and a horizontal read pulse, the signal charge read to said signal line is converted into a voltage by a charge detection amplifier connected to the signal line, and a read scanning pulse and an electronic shutter scanning pulse are output from both of a horizontal scanning circuit and a vertical scanning circuit.

According to the present invention, in the driving method for a solid state image pickup device described above, one pulse is raised for each pixel as the read scanning pulse, one pulse is raised for each pixel as the electronic shutter scanning pulse, and one of the read scanning pulse and the electronic shutter scanning pulse is output at a timing at which phases of the read scanning pulse and the electronic shutter scanning pulse do not overlap.

The present invention is a camera comprising an optical system, and a solid state image pickup device having a means for simultaneously performing reading of one row and an electronic shutter for the other row in a one-pixel signal period.

Figure 3:
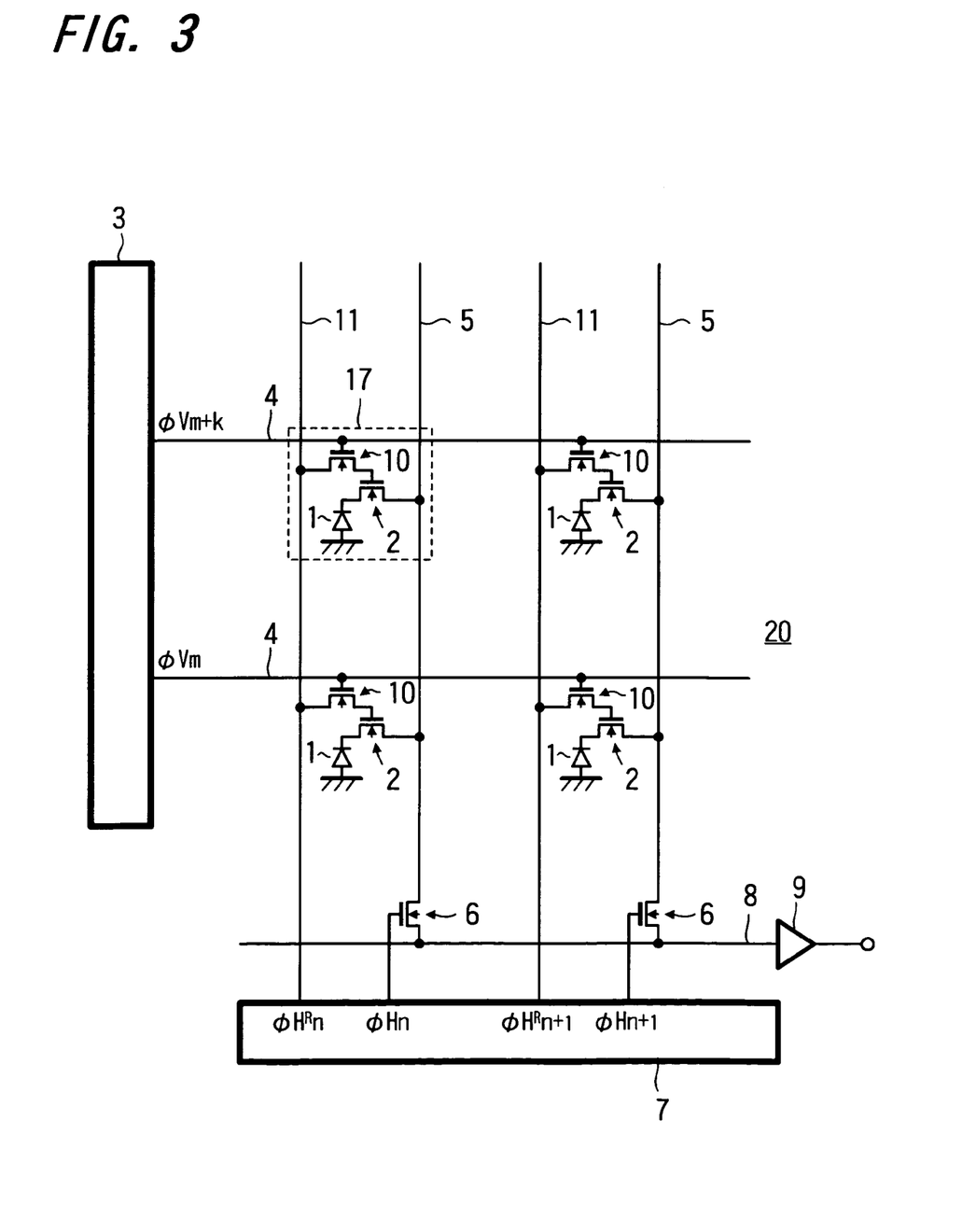
FIG. 3 is a schematic view showing the arrangement of the circuit of a solid state image pickup device according to the present invention.

FIG. 3 shows the arrangement of a solid state image pickup device according to an embodiment of the present invention.

This solid state image pickup device 20 is constituted by an image pickup region formed by arranging a plurality of unit pixels 17, each of which is constituted of a photodiode 1 for performing photoelectric conversion and a vertical selection switch (e.g., MOS transistor) 2 for selecting a pixel, in the form of a matrix, a vertical scanning circuit 3 for outputting vertical scanning pulses $\phi V$ [$\phi V1$, ... $\phi Vm$, ... $\phi Vm+k$, ...] to a vertical selection line 4 to which control electrodes of read control switches 10 of each row are commonly connected, a vertical signal line 5 to which main electrodes of the vertical selection switches 2 of each column are commonly connected, a horizontal switch (e.g., MOS transistor) 6 having a main electrode connected to the vertical signal line 5 and a horizontal signal line 8, a horizontal scanning circuit 7 connected to the control electrode of the horizontal switch 6 and the horizontal read scanning line 11, and an amplifier 9 connected to the horizontal signal line 8.

In each of the unit pixels 17, one main electrode of the vertical selection switch 2 is connected to the photodiode 1, and the other main electrode thereof is connected to the vertical signal line 5. One main electrode of the read control switch 10 is connected to the control electrode thereof of the vertical selection switch 2, the other main electrode thereof is connected to the horizontal read scanning line 11, and the control electrode thereof is connected to the vertical selection line 4.

A horizontal scanning pulse $\phi H$[$\phi H1$, ... $\phi Hn$, $\phi Hn+1$ ...] is supplied from the horizontal scanning circuit 7 to the control electrode of each of the horizontal switches 6, and a horizontal read scanning pulse $\phi H^R$[$\phi H^R1$, ... $\phi H^Rn$, $\phi H^Rn+1$, ...] is supplied to each of the horizontal read scanning lines 11.

The basic operation of the solid state image pickup device 20 is as follows.

The vertical scanning pulse $\phi Vm$ and the horizontal scanning pulse $\phi H^Rn$ are applied from the vertical scanning circuit 3 and the horizontal scanning circuit 7, respectively, and the read control switch 10 which receive these pulses $\phi Vm$ and $\phi H^Rn$ forms a pulse of the product of the pulses $\phi Vm$ and $\phi H^Rn$. The vertical selection switch 2 is controlled by the pulse of the product, and a signal charge photoelectrically converted by the photodiode 1 is read to the vertical signal line 5.

The signal charge is output to the horizontal signal line 8 through the horizontal switch 6 controlled by the horizontal scanning pulse $\phi Hn$ from the horizontal scanning circuit 7, and is converted into a signal voltage by the amplifier 9 connected to the horizontal signal line 8 to output the signal voltage.

Timing charts are shown in FIG. 2 and FIG. 3 when an electronic shutter operation is performed in the solid state image pickup device 20.

Figure 4:
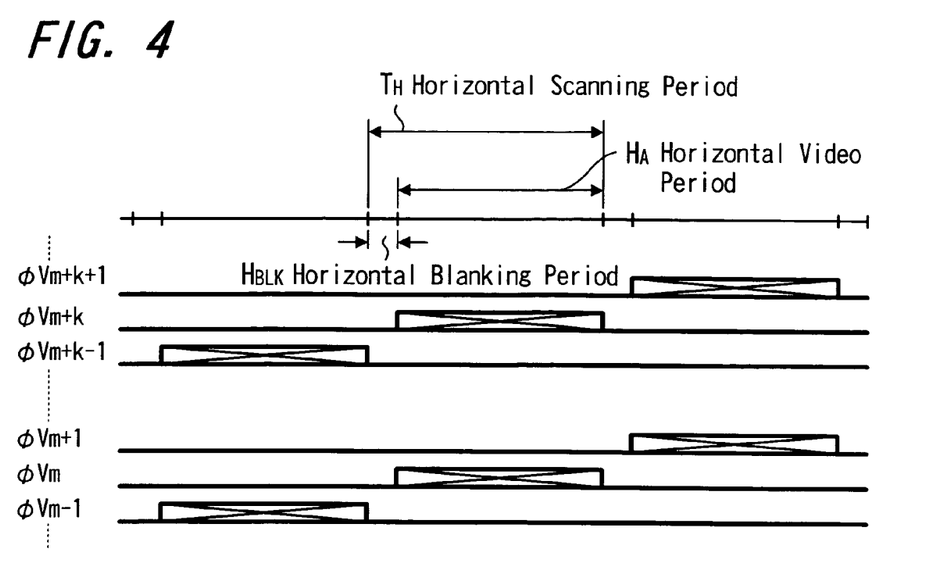
FIG. 4 is a timing chart of vertical scanning pulses in the solid state image pickup device shown in FIG. 3.

FIG. 4 is a timing chart showing vertical scanning pulses $\phi V$ to the vertical signal line 4, and shows that vertical scanning pulses $\phi Vm$ and $\phi Vm+k$ in the mth row and in the (m+k)th row rise for an electronic shutter operation in the same horizontal scanning period, and, when a horizontal scanning period is represented by $T_H$, the shutter speed of the electronic shutter is given by $k \times T_H$.

Portions indicated by crossing oblique lines in FIG. 4 represent portions including a large number of on/off pulses.

Figure 5:
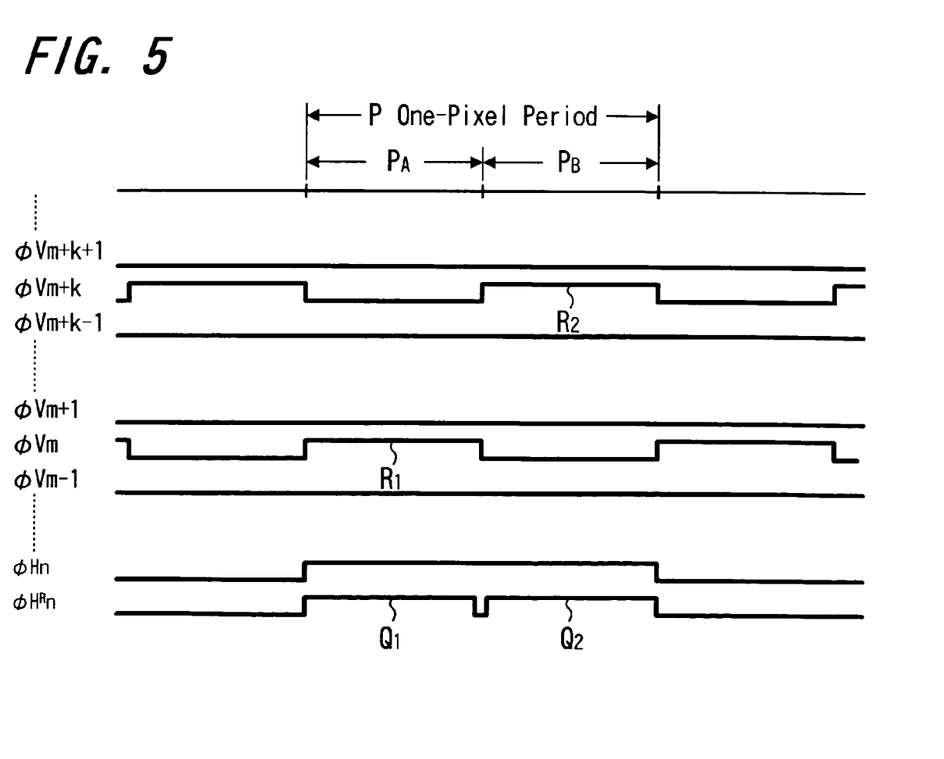
FIG. 5 is a timing chart of operation timings in the solid state image pickup device shown in FIG. 3.

FIG. 5 is a timing chart exactly showing vertical scanning pulses $\phi V$, horizontal scanning pulses $\phi H$, and horizontal read scanning pulses $\phi H^R$ to understand a timing for exhausting unnecessary signal discharges from the photodiode 1 and a timing for reading the signal charges.

Now, in a one-pixel period P in which signals of pixels in the nth column are output in a horizontal scanning period in which reading in the mth row is performed, the vertical scanning pulse (read scanning pulse) $\phi Vm$ (see pulse $R_1$) of the mth row rises in a first half $P_A$ of the one-pixel period P, and, in synchronism with this, a horizontal read scanning pulse $\phi H^Rn$ (see pulse $Q_1$) rises, so that the signal charge of a pixel in the mth row in the nth column is read to the vertical signal line 5.

At this time, since the horizontal scanning pulse $\phi Hn$ rises, the signal charge read to the vertical signal line 5 is amplified to a voltage by the amplifier 9 connected to an end of the horizontal signal line 8 through the horizontal switch 6, and the voltage is output as a video signal from the solid state image pickup device 20.

On the other hand, in a second half $P_B$ of the one-pixel period P in which signals of pixels in the same nth column are output, a vertical scanning pulse (electronic shutter scanning pulse) $\phi Vm+k$ (see pulse $R_2$) rises, and, in synchronism with the vertical scanning pulse $\phi Vm+k$, a horizontal read scanning pulse $\phi H^Rn$ (see pulse $Q_2$ used in electronic shutter) rises, so that an unnecessary charge of a pixel in the (m+k)th row in the nth column is exhausted to the vertical signal line 5. The unnecessary charges are absorbed by the amplifier 9 through the horizontal signal line 8.

In this manner, with respect to the vertical scanning pulse φV, the phase of the vertical scanning pulse φVm for reading signal charges is shifted from the phase of the vertical scanning pulse φVm+k for exhausting unnecessary charges, so that the unnecessary charges can be exhausted without adversely affecting the signal charges read from pixels.

The accumulation time of a pixel is a time obtained by adding ½ of the one-pixel period P to k×$T_H$. The accumulation times of all the pixels can be made constant.

Therefore, an electronic shutter can be realized without a contrast between light and shade in an image caused by variations in accumulation times.

When the electronic shutter is operated, driving is performed as described above. However, in order to switch the operation to a general operation which does not perform the electronic shutter, the electronic shutter scanning pulse φVm+k (see pulse $R_2$) of the vertical scanning pulses φV is prevented from being raised.

In the timing chart of FIG. 5, the horizontal read scanning pulse φ$H^R$n and the horizontal scanning pulse φHn are formed at different timings, respectively. However, in order to make driving simple, the horizontal read scanning pulse φ$H^R$n and the horizontal scanning pulse φHn may be formed at the same timing.

Figure 6:
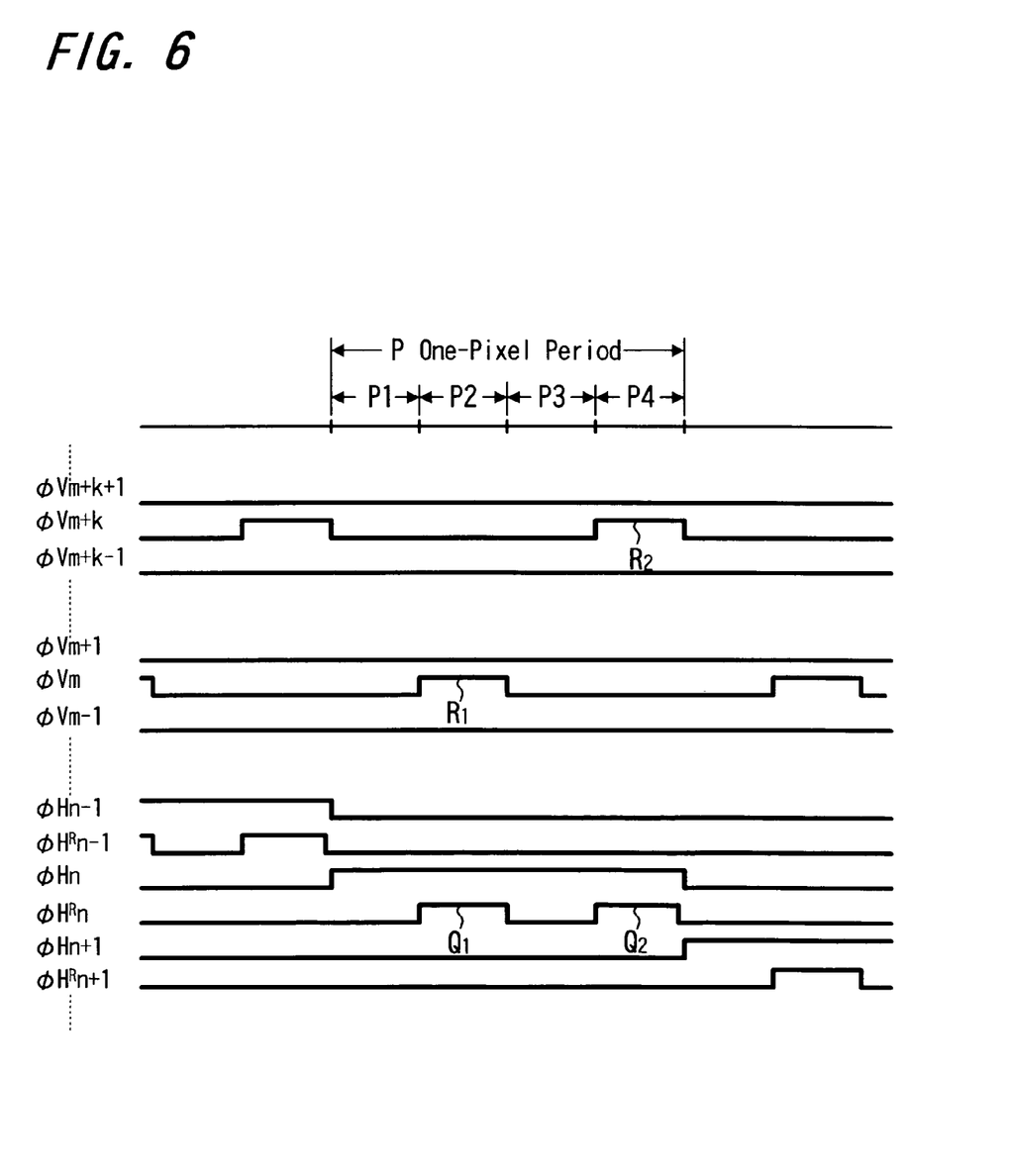
FIG. 6 is a timing chart of other operation timings in the solid state image pickup device shown in FIG. 3.

A timing chart of operation timings different from those in FIG. 5 in the solid state image pickup device 20 shown in FIG. 3 is shown in FIG. 6.

In case of FIG. 6, the operation timings are applied to case wherein both signals N and S, i.e., a level, i.e., a noise signal N obtained before a signal charge is read in the one-pixel period P and a pixel signal S obtained by adding the level for reading a signal, i.e., the noise signal N to a net signal are output from the solid state image pickup device 20.

In the operation timings, the one-pixel period P is divided into four ¼ periods P1, P2, P3, and P4.

In order to output the noise signal N in the first ¼ period P1, the horizontal scanning pulse φHn is raised without raising the vertical scanning pulses φV. Since no signal charge is read from the photodiode 1 at this time, noise signals N existing in the vertical signal line 5 and the horizontal signal line 8 are output from the amplifier 9.

In the next second ¼ period P2, a read scanning pulse $R_1$ rises in the vertical scanning pulse φVm, and, in synchronism with this, the horizontal read scanning pulse φ$H^R$n (see pulse Q1 used in reading) rises. The read control switch 10 in the mth row and in the nth column which receives the pulses φVm and φ$H^R$n renders the vertical selection switch 2 connected to the read control switch conductive, and a signal charge photoelectrically converted by the photodiode 1 is red to the vertical signal line 5.

In the next third ¼ period P3, the above read scanning pulse $R_1$ and the horizontal read scanning pulse φ$H^R$n (see pulse Q1) fall, and the switches 2 and 10 are set in the same state as that in which the noise signal N is output. A signal charge read in the period P3 is amplified into a voltage by the amplifier 9 connected to the horizontal signal line 8, and the voltage is output as a pixel signal S obtained by adding the noise signal N to the net signal. The difference between the noise signal N and the pixel signal S is a net video signal.

In the fourth ¼ period P4, an electronic shutter read scanning pulse $R_2$ rises in the vertical scanning pulse φVm+k, and, in match therewith, the horizontal read scanning pulse φ$H^R$n (see pulse $Q_2$ used in electronic shutter) rises. The read control switch 10 in the (m+k)th row and in the nth column renders the vertical selection switch 2 connected to the read control switch conductive, an unnecessary charge is exhausted from the photodiode 1 in the (m+k)th row and in the nth column to the vertical signal line 5, and the accumulation times of the pixels are controlled.

As described above, the period P4 for the electronic shutter is set in the one-pixel period P, and the electronic shutter scanning pulse R2 having a phase different from that of the read scanning pulse $R_1$ and matched with the period for the electronic shutter is raised in the vertical scanning pulse, so that the electronic shutter can be realized.

As in the timing chart in FIG. 5, the accumulation time of a pixel becomes a time obtained by adding a ½ time (P1+P2) in the one-pixel period P to k×$T_H$, and the accumulation times of all the pixels can be made constant.

According to the solid state image pickup device 20 of the above embodiment, when reading of the mth row and resetting of the (m+k)th row are simultaneously performed in the one-pixel period, the accumulation time of each pixel can be made constant. For this reason, the above shading can be prevented.

In addition, an electronic shutter can be realized without adding the function of an electronic shutter to a pixel, the pixel is not hindered from being reduced in size.

Figure 7:
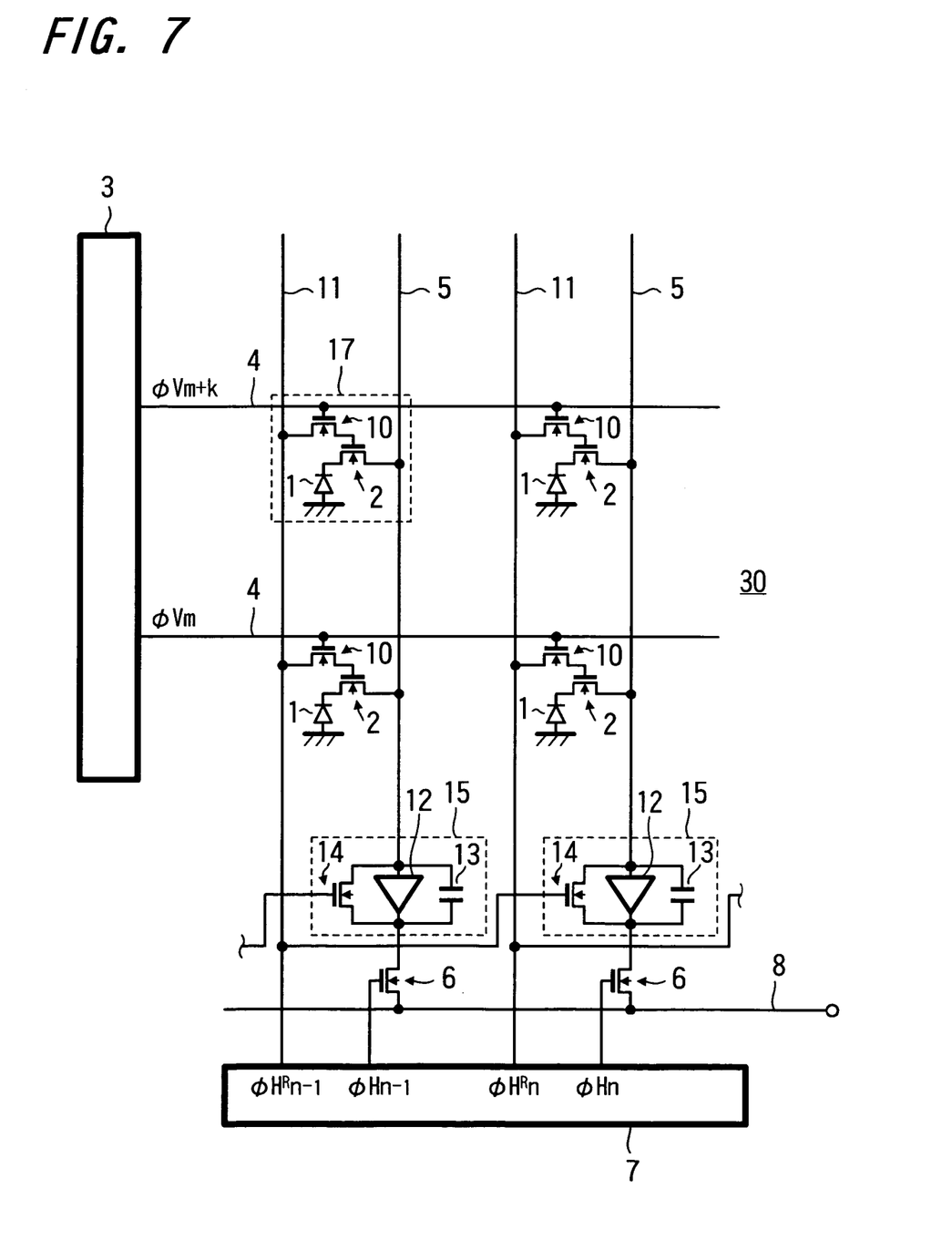
FIG. 7 is a schematic view showing the arrangement of the circuit of another solid state image pickup device according to the present invention.

A solid state image pickup device according to another embodiment of the present invention is shown in FIG. 7.

This solid state image pickup device 30 is constituted by an image pickup region formed by arranging a plurality of unit pixels 17, each of which is constituted by a photodiode 1, a vertical selection switch (e.g., MOS transistor) 2, and a read control switch (e.g., MOS transistor) 10, in the form of a matrix, a vertical scanning circuit 3 for outputting vertical scanning pulses φV [φV1, . . . φVm, . . . φVm+k, . . . ] to a vertical selection line 4 to which control electrodes of the read control switches 10 of each row are commonly connected, a vertical signal line 5 to which main electrodes of the vertical selection switches 2 of each column are commonly connected, a horizontal read scanning line 11 connected to the main electrodes of the read control switches 10 of each column, a charge detection circuit 15 arranged outside the image pickup region, connected to the vertical signal line 5, and constituted by an inversion amplifier 12, a detection capacitor 13 and a reset switch 14, a horizontal switch (e.g., MOS transistor) 6 for selecting a signal from the charge detection circuit 15 to output the signal to a horizontal signal line, a horizontal scanning circuit 7 for controlling the control electrode of the horizontal switch 6 and the horizontal read scanning line 11, and a horizontal signal line 8 for outputting the signal.

In each of the unit pixels 17, as similar to the above description, one main electrode of the vertical selection switch 2 is connected to the photodiode 1, and the other main electrode thereof is connected to the vertical signal line 5. One main electrode of the read control switch 10 is connected to the control electrode of the vertical selection switch 2, and the other main electrode thereof is connected to the horizontal read scanning line 11.

In the charge detection circuit 15, the vertical signal line 5 is connected to the inversion input terminal of the inversion amplifier 12 (e.g., operational amplifier using a differential amplifier or the like), a predetermined bias voltage (not shown) is given to the non-inversion input terminal of the inversion amplifier and the output terminal of the inversion amplifier 12 is connected to one main electrode of the horizontal switch 6. The detection capacitor 13 is connected in parallel to the inversion amplifier 12, i.e., between the inversion input terminal and the output terminal of the inversion amplifier 12, and the reset switch 14 for resetting the detection capacitor 13 is connected in parallel to the detection capacitor 13.

In addition, the control electrodes of the reset switches 14 of the respective charge detection circuits 15 are connected to the vertical signal lines of columns preceding by one, respectively.

Horizontal scanning pulses φH [φH1, ... φHn−n, φHn, ...] from the horizontal scanning circuit 7 are supplied to the control electrodes of the horizontal switches 6 of corresponding columns, and horizontal read scanning pulses φ$H^R$[φ$H^R$1, ... φ$H^R$n−1, φ$H^R$n, ...] are simultaneously supplied to the control electrodes of the reset switches 14 in the charge detection circuits connected to the horizontal read scanning line 11 on a corresponding column and the vertical signal line 5 on the next column.

Figure 8:
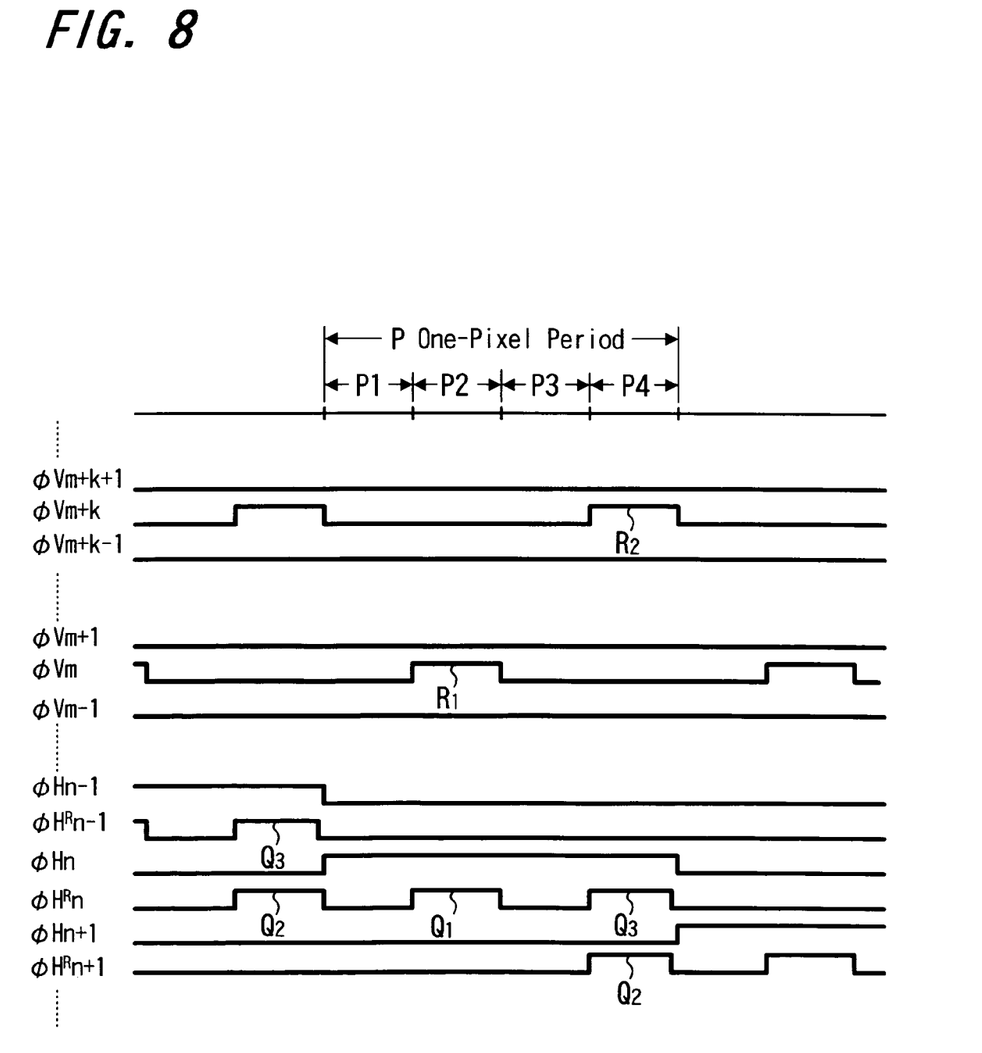
FIG. 8 is a timing chart of operation timings in the solid state image pickup device shown in FIG. 7.

FIG. 8 shows a timing chart of the solid state image pickup device 30 in FIG. 7. A basic operation thereof will be described below according to this timing chart.

In the operation timings, the operation is performed such that a one-pixel period P is divided into four periods P1, P2, P3, and P4.

Before a signal charge is read from the photodiode 1 in the mth row and in the nth column, the charge detection circuit 15 and the vertical signal line 5 in the nth column are reset by a horizontal scanning read pulse φ$H^R$n−1 (see $Q_3$ used in a reset pulse) which rises in the fourth period P4 of the one-pixel period P in the previous (n−1)th column.

In the first period P1 of the one-pixel period P corresponding to the photodiode 1 in the mth row and in the nth column to be read, a signal (noise signal N) set in a state obtained before a signal charge is read from the photodiode 1 is converted into a voltage by the charge detection circuit 15 without rendering the vertical selection switch 2 for performing reading conductive.

This noise signal N is output from the horizontal signal line 8 in the first period P1 through the horizontal switch 6 controlled by the horizontal scanning pulse φHn.

Next, in the second period P2 of the one-pixel period P, a read scanning pulse $R_1$ of the vertical scanning pulse φVm and the horizontal read scanning pulse φ$H^R$n (see pulse Q1 used in reading) rise, the read control switch 10 in the mth row and in the nth column which receives these pulses renders the vertical selection switch 2 connected to the read control switch conductive, and a signal charge photoelectrically converted by the photodiode 1 is read to the vertical signal line 5.

In the third period P3 of the one-pixel period P, the previous read scanning pulse φVm (see pulse $R_1$) and the horizontal read scanning pulse φ$H^R$n (see pulse Q1) fall, the vertical selection switch is set in the same state as that wherein the noise signal N is being read, and a pixel signal S serving as the noise signal N and a net video signal is obtained from the charge detection circuit 15. At this time, the pixel signal S is output from the horizontal signal line 8 in the third period P3 in the one-pixel period through the horizontal switch 6 controlled by the horizontal scanning pulse φHn.

When the difference between the noise signal N and the pixel signal S output as described above is calculated by a method such as correlated double-sampling or the like, a net video signal from which noise is removed can be obtained.

The above-mentioned correlated double sampling can be performed such that, e.g., a correlated double sampling circuit (to be referred to as a CDS (Correlated Double Sampling) circuit hereinafter; see FIG. 12) is provided at the post-stage of the amplifier 9, i.e., at the output terminal side of the horizontal signal line 8 to calculate the difference between the noise signal N and the pixel signal S sequentially supplied from each of the unit pixels through the horizontal signal line 8.

Figure 12:
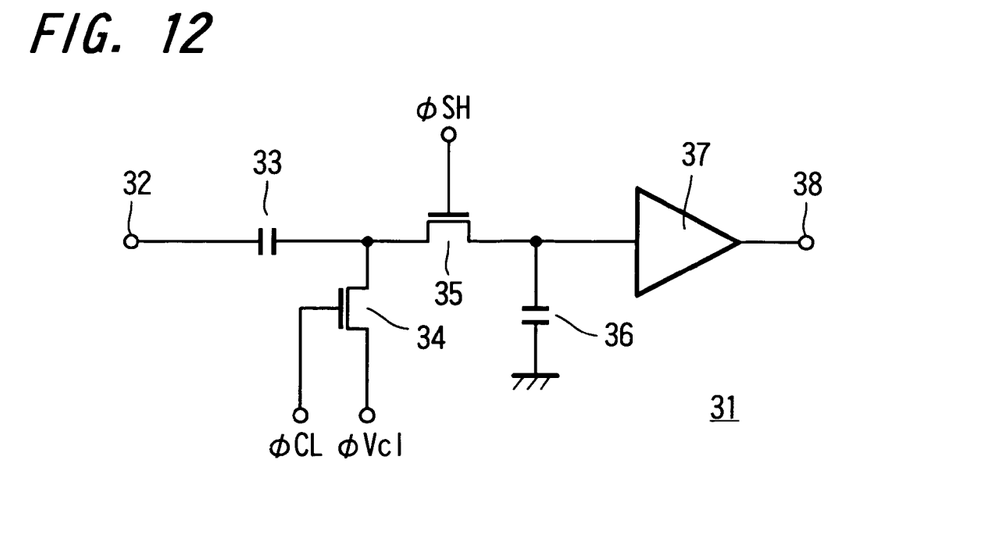
FIG. 12 is a circuit diagram showing an example of the arrangement of a CDS circuit.

FIG. 12 shows an example of the circuit arrangement of the CDS circuit.

This CDS circuit 31 is constituted by a clamping capacitor 33 having one end connected to an input terminal 32, a clamping MOS transistor 34 having one main electrode connected to the other terminal of the clamping capacitor 33, a sample and hold MOS transistor 35 having one main electrode connected to the other terminal of the clamping capacitor 33, a sample and hold capacitor 36 connected between the other main electrode of the sample and hold MOS transistor 35 and a ground portion, and a buffer amplifier 37 connected between the other main electrode of the sample and hold MOS transistor 35 and an output terminal 38.

In the CDS circuit 31, a clamping voltage Vc1 is applied to the other main electrode of the clamping MOS transistor 34, and a clamping pulse φCL is applied to the gate electrode of the clamping MOS transistor, respectively. A sample and hold pulse φSH is applied to the gate electrode of the clamping MOS transistor 35.

By using the CDS circuit 31 having the above-mentioned arrangement, when the correlated double sampling is performed by using a noise signal and a pixel signal sequentially supplied, a noise component included in a pixel signal component can be removed to obtain a net video signal.

On the other hand, in the electronic shutter operation of the solid state image pickup device 30 described above, in the fourth period P4 in the one-pixel period P, an electronic shutter scanning pulse $R_2$ rises in the vertical scanning pulse φVm+k in the (m+k)th row. At the same time, the horizontal read scanning pulse φ$H^R$n+1 (see pulse $Q_2$ used in electronic shutter) rises, and, while a signal charge of the photodiode 1 in the mth row and in nth column is being read, an unnecessary charge of the photodiode 1 in the (m+k)th row and in the (n+1)th column is exhausted to the vertical signal line 5 in the (n+1)th column.

In this case, at the same time, the charge detection circuit 15 connected to the (n+1)th column is reset by the horizontal read scanning pulse φ$H^R$n (see pulse $Q_3$) in the nth column which rises in the fourth period P4, and an unnecessary charge of the photodiode 1 in the (m+k)th row and in the (n+1)th column is also reset.

In this manner, when the phases of the read scanning pulse $R_1$ and the read scanning pulse $R_2$ of the vertical scanning pulses φV and the phases of the pulse Q1 used for reading the horizontal read scanning pulses φ$H^R$ and the pulse $Q_2$ used in an electronic shutter are set to have the above correspondences, a signal is output from the photodiode 1 in the mth row and in the nth column, and an unnecessary charge of the photodiode 1 in the (m+k)th row and in the (n+1)th column is exhausted. The electronic shutter operation is performed due to the fact that the accumulation times of the pixels are limited.

When the electronic shutter operation is performed as described above, even in the solid state image pickup device 30 according to the embodiment, as similar to the solid state image pickup device 20 according to the embodiment previously described, the accumulation time of each pixel can be made constant. For this reason, the shading described above can be prevented.

Furthermore, since an electronic shutter can be realized without adding the function of the electronic shutter to the pixels, the pixel can be hindered from being reduced in size.

In the solid state image pickup device 30 according to the embodiment shown in FIG. 7, the reset switch 14 of the charge detection circuit 15 is reset by the horizontal read scanning pulse $\phi H^R n$ in the previous column. However, the reset switch 14 can also be reset by applying a pulse which is dedicated to the reset switch 14 and is different from the horizontal read scanning pulse $\phi H^R n$.

Figure 9:
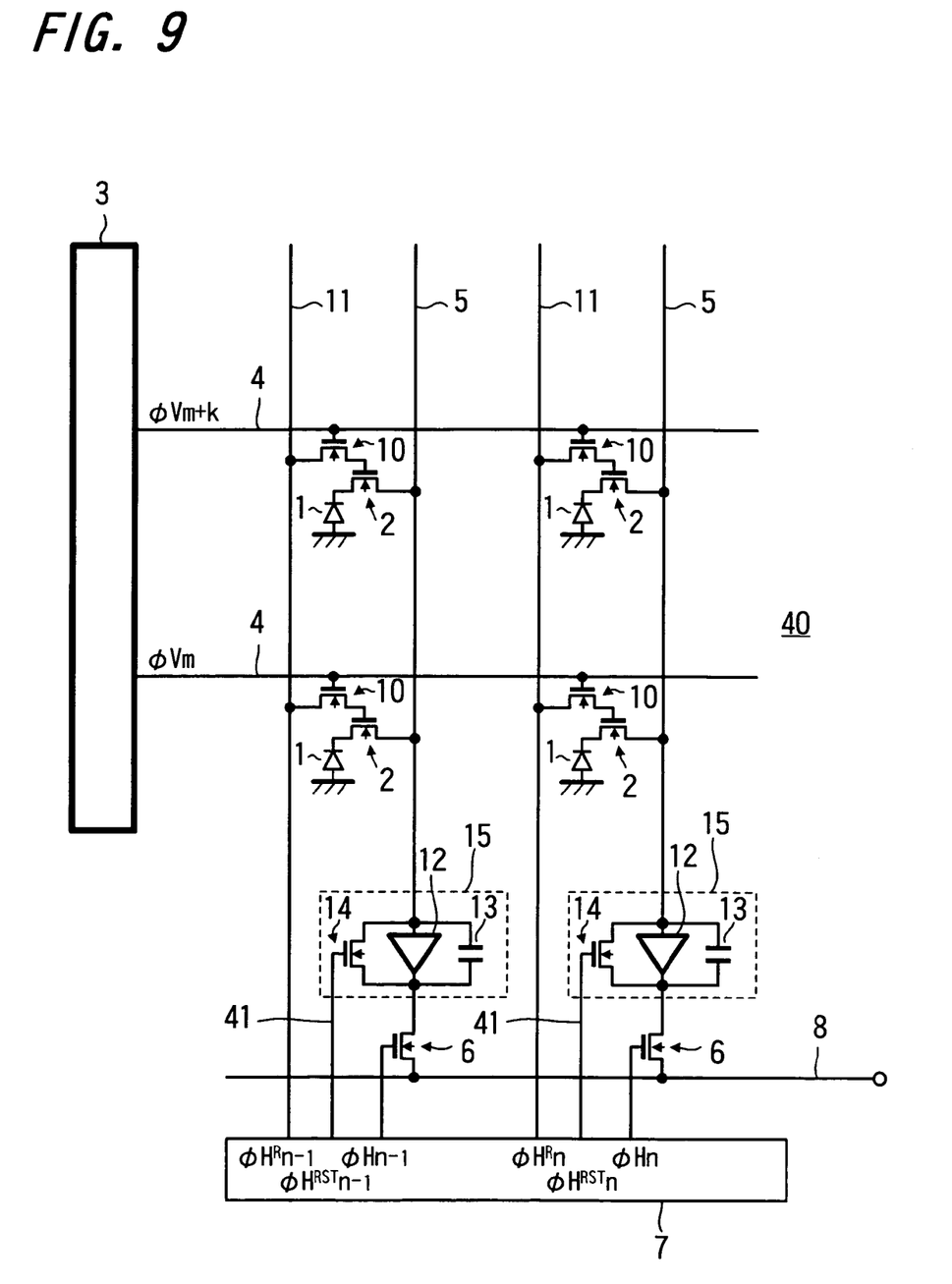
FIG. 9 is a schematic view showing the arrangement of the circuit of still another solid state image pickup device according to the present invention.

The arrangement of the solid state image pickup device in this case is shown in FIG. 9.

In a solid state image pickup device 40 shown in FIG. 9, conductive lines 41 for applying reset pulses $\phi H^{RST}$ [$\phi H^{RST}$, ... $\phi H^{RST} n$, ... ] for resetting the reset switches 14 of the charge detection circuits 15 are provided in correspondence with the respective columns.

The reset pulses $\phi H^{RST}$ rise in a one-pixel period P in which reading is performed to the same column, in a one-pixel period P before the one-pixel period P in which the horizontal scanning pulse $\phi Hn$ is applied, thereby resetting the reset switch 14.

Since the same reference numerals as in the solid state image pickup device 30 shown in FIG. 7 denote the same parts in the other arrangement, a description thereof will be omitted.

Figure 10:
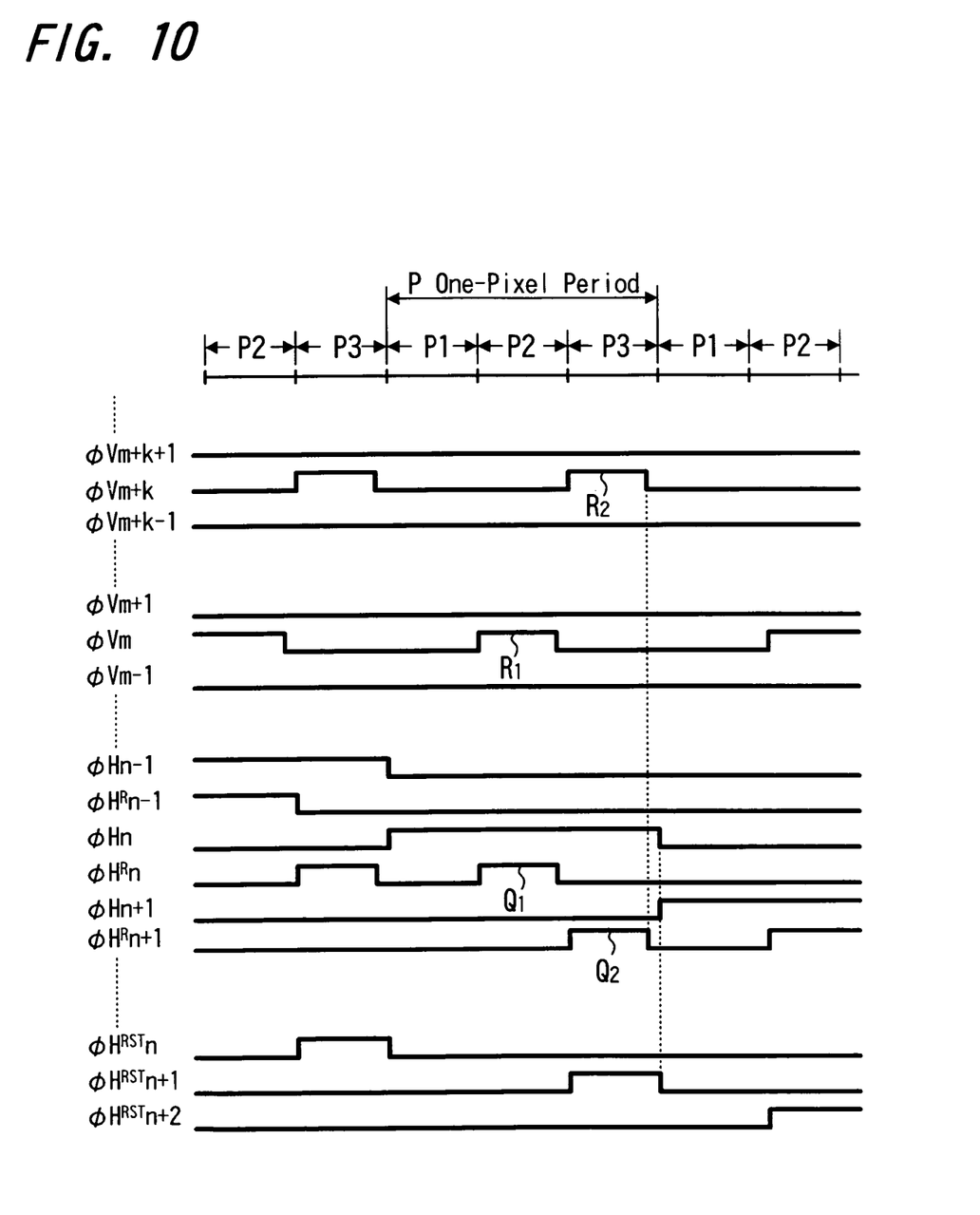
FIG. 10 is a timing chart of operation timings in the solid state image pickup device shown in FIG. 9.

A timing chart of operation timings of the solid state image pickup device 40 is shown in FIG. 10.

At the operation timings, an operation is performed such that a one-pixel period P is divided into three periods P1, P2, and P3.

Before a signal charge is read from a photodiode 1 in the mth row and in the nth column, a charge detection circuit 15 and a vertical signal line 5 in the nth column are reset in advance by a reset pulse $\phi H^{RST} n$ in the nth column which rises in the last period P3 of the one-pixel period P in the (n−1)th column before the nth column.

Next, in the first period P1 of the one-pixel period P corresponding to the photodiode 1 in the mth row and in the nth column to be read, a signal (noise signal N) in a state obtained before a signal charge is read from the photodiode 1 is converted into a voltage by the charge detection circuit 15 without rendering a vertical selection switch 2 for performing reading conductive.

This noise signal N is output from a horizontal signal line 8 in the first period P1 through a horizontal switch 6 controlled by a horizontal scanning pulse $\phi Hn$.

Next, in the second period P2 of the one-pixel period P, a read scanning pulse $R_1$ of a vertical scanning pulse $\phi Vm$ and a horizontal read scanning pulse $\phi H^R n$ (see pulse Q1 used in reading) rise, the read control switch 10 in the mth row and in the nth column which receives these pulses renders the vertical selection switch 2 connected to the read control switch conductive, and a signal charge photoelectrically converted by the photodiode 1 is read to the vertical signal line 5.

Next, in the last period P3 of the one-pixel period P, the previous read scanning pulse $\phi Vm$ (see pulse $R_1$) and the horizontal read scanning pulse $\phi H^R n$ (see pulse Q1) fall, the vertical selection switch is set in the same state as that wherein the noise signal N is read, and a pixel signal S serving as the noise signal N plus a net video signal is obtained from the charge detection circuit 15. At this time, the pixel signal S is output from the horizontal signal line 8 in the last period P3 in the one-pixel period through the horizontal switch 6 controlled by the horizontal scanning pulse $\phi Hn$.

When the difference between the noise signal N and the pixel signal S output as described above is calculated by a method such as the correlated double sampling or the like, a net video signal from which noise is removed can be obtained.

On the other hand, in the electronic shutter operation of the solid state image pickup device 40 described above, in the last period P3 in the one-pixel period P, an electronic shutter scanning pulse $R_2$ rises in the vertical scanning pulse $\phi Vm+k$ in the (m+k)th row. At the same time, the horizontal read scanning pulse $\phi H^R n+1$ (see pulse $Q_2$ used in electronic shutter) rises, and, while a signal charge of the photodiode 1 in the mth row and in nth column is being read, an unnecessary charge of the photodiode 1 in the (m+k)th row and in the (n+1)th column is exhausted to the vertical signal line 5 in the (n+1)th column.

In this case, at the same time, the charge detection circuit 15 connected to the (n+1)th column is reset by the reset pulse $\phi H^{RST}$ n+1 in the (n+1)th column which rises in the last period P3, and an unnecessary charge of the photodiode 1 in the (m+k)th row and in the (n+1)th column is also reset.

In this manner, when the phases of the read scanning pulse $R_1$ and the read scanning pulse $R_2$ of the vertical scanning pulses $\phi V$ and the phases of the pulse Q1 used for reading the horizontal read scanning pulses $\phi H^R$ and the pulse $Q_2$ used in an electronic shutter are set to have the above correspondences, while a signal is output from the photodiode 1 in the mth row and in the nth column, an unnecessary charge of the photodiode 1 in the (m+k)th row and in the (n+1)th column is exhausted. The electronic shutter operation is performed due to the fact that the accumulation times of the pixels are limited.

In the last period P3 of the one-pixel period P, the horizontal read scanning pulse $\phi H^R n+1$ and the reset pulse $\phi H^{RST} n+1$ in the same (n+1)th column rise.

Although the horizontal read scanning pulse $\phi H_R n+1$ is turned off before the one-pixel period P is ended, the reset pulse $\phi H^{RST} n+1$ is in an ON state until the one-pixel period P is ended, and is shifted in phase.

When a signal charge exceeds a so-called dynamic range to be saturated, the signal charge of a vertical signal line may not be sufficiently reset.

As described above, when the charge detection circuit 15 is reset by the reset pulses $\phi H^{RST}$, resetting is performed by using a line which is not used in reading of the previous column, and saturation of the signal charge is suppressed. For this reason, the signal charge can be sufficiently reset.

Even in the solid state image pickup device 40 according to the embodiment described above, as similar to the solid state image pickup device 20 according to the embodiment previously described, the accumulation time of each pixel is not made constant. For this reason, the shading mentioned before can be prevented.

Furthermore, since an electronic shutter can be realized without adding the function of the electronic shutter to the pixels, the pixels is not hindered from being reduced in size.

In each of the solid state image pickup devices 20, 30, and 40 according the above embodiments, each pixel has an arrangement constituted by the photodiode 1, the vertical selection switch 2, and the read control switch 10. However, even in another pixel arrangement, an electronic shutter operation, as in the above arrangement, an electronic shutter operation can be performed while the accumulation times of the pixels are made constant.

The schematic arrangement of a camera according to the present invention using a solid state image pickup device having the arrangement mentioned above and a method therefor is shown in FIG. 11.

Figure 11:
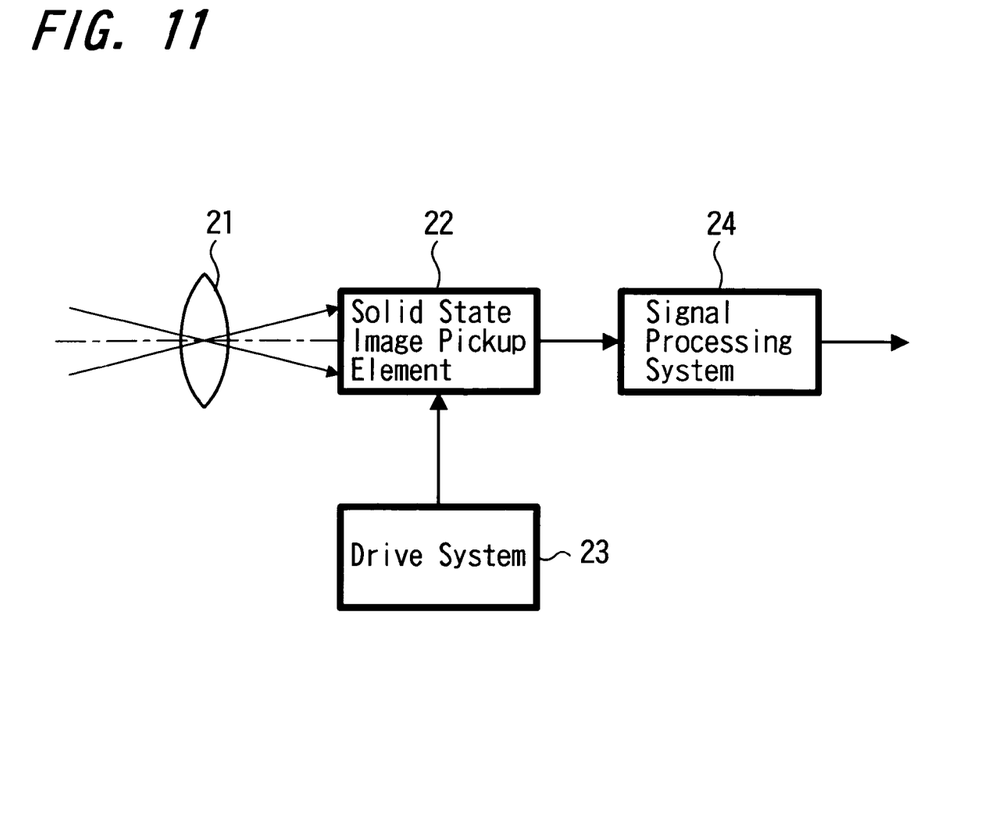
FIG. 11 is a schematic view showing the arrangement of a camera according to the present invention.

Referring to FIG. 11, an incident light from an object to be photographed is focused on an image pickup surface of a solid state image pickup element 22 by an optical system including a lens 21. As the solid state image pickup element 22, a solid state image pickup element having the same arrangement as that of a solid state image pickup element used in the solid state image pickup device 20, 30, or 40 having the arrangement shown in FIG. 3, FIG. 7, or FIG. 9 is used.

The solid state image pickup element 22 is driven by a drive system 23 on the basis of the driving method described above. More specifically, in a one-pixel period P, reading of one row and an electronic shutter operation for another row are simultaneously performed.

An output signal from the solid state image pickup element 22 is subjected to various signal processings by a signal processing system 24 to be a video signal.

In the camera having the arrangement, a signal formed such that the accumulation time of each pixel in an electronic shutter operation is made constant is directly output from the solid state image pickup element 22.

When the output signal is input to the signal processing system 24 having the same arrangement as a conventional arrangement, a preferable image being free from a contrast between light and shade can be obtained by suppressing shading even if a shutter speed is high, and a camera having compatibility with a conventional system can be realized.

The solid state image pickup device, the driving method therefor, and the camera according to the present invention are not limited to the above embodiments. However, the solid state image pickup device, the driving method, and the camera can have various arrangements without departing from the spirit and scope of the invention.

According to the present invention described above, when reading of one row and an electronic shutter for the other row are simultaneously performed in a one-pixel signal period, an electronic shutter operation can be set such that the accumulation time of each pixel is made constant, and a preferable image being free from a contrast between light and shade can be obtained by preventing shading even if a shutter speed is high.

According to the present invention, since an electronic shutter can be realized without adding the function of the electronic shutter to pixels, a solid state image pickup device being capable of performing an electronic shutter without hindering the pixels from being reduced in size can be constituted.

Therefore, according to the present invention, a solid state image pickup device designed such that pixels are reduced in size to increase the number of pixels and reduce the entire device in size, and a camera can be constituted.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An XY address type solid state image pickup device comprising a plurality of pixels each having a photoelectric conversion unit producing a signal from incident light arranged in rows and columns, a horizontal scanning circuit and a vertical scanning circuit, wherein a reading operation for a signal of a pixel in one row and an electronic shutter operation for a signal of a pixel in another row are carried out wherein the solid state image pickup device has a plurality of signal lines, each of said signal lines being associated with corresponding pixels and each of said signal lines is used for both said reading operation and said shutter operation an wherein a single signal output line is used for transferring both image output signals and output from the shutter operation for a pixel and further wherein the image output signals and output from the shutter operation for a plurality of pixels pass through a common transistor.

2. A solid state image pickup device according to claim 1, characterized in that a reading operation of a signal of a pixel in one column in the one row and an electronic shutter operation for a signal of a pixel in the one column in the other row are performed during a same time period.

3. A solid state image pickup device according to claim 1, characterized in that a reading operation of a signal of a pixel in one column in the one row and an electronic shutter operation for a signal of a pixel in a column adjacent to the one column in the other row are performed during a same time period.

4. A solid state image pickup device according to claim 1, characterized in that a read scanning pulse and an electronic shutter scanning pulse are respectively supplied from said horizontal scanning circuit and said vertical scanning circuit.

5. A solid state image pickup device according to claim 4, characterized in that one pulse is supplied for each pixel as the read scanning pulse, one pulse is supplied for each pixel as the electronic shutter scanning pulse, and one of the read scanning pulse and the electronic shutter scanning pulse is supplied at a timing such that phases of the read scanning pulse and the electronic shutter scanning pulse do not overlap.

6. A solid state image pickup device according to claim 1, wherein a vertical selection switch for reading a signal charge, from the pixel in the photoelectric conversion unit, to a signal line is controlled by a product between a vertical scanning pulse and a horizontal read pulse, and further wherein a charge detection amplifier for converting the read signal charge into a voltage is connected to said signal line, and a read scanning pulse and an electronic shutter scanning pulse are respectively supplied from the horizontal scanning circuit and the vertical scanning circuit.

7. A solid state image pickup device according to claim 6, characterized in that one pulse is supplied for each pixel as the read scanning pulse, one pulse is supplied for each pixel as the electronic shutter scanning pulse, and one of the read scanning pulse and the electronic shutter scanning pulse is supplied such that phases of the read scanning pulse and the electronic shutter scanning pulse do not overlap.

8. A method for driving an XY address type solid state image pickup device having an image pickup region with a plurality of pixels each having a photoelectric conversion unit producing a signal from incident light arranged in rows and columns, a horizontal scanning circuit, a vertical scanning circuit and a plurality of signal lines being associated with corresponding pixels comprising:
performing a reading operation for a signal of a pixel in one row and an electronic shutter operation for a signal of a pixel in another row and further wherein each of said signal lines is used for both said reading operation and said shutter operation and wherein a single signal output line is used for transferring both image output signals and output from the shutter operation for a pixel and further wherein the image output signals and output from the shutter operation for a plurality of pixels pass through a common transistor.

9. A driving method for a solid state image pickup device according to claim 8, characterized in that a reading operation of a signal of a pixel in one column in the one row and an electronic shutter operation for a signal of a pixel in the one column in the other row are performed during a same period of time.

10. A driving method for a solid state image pickup device according to claim 8, characterized in that the reading operation of a pixel in one column in the one row and an electronic shutter operation for a pixel in a column adjacent to the one column in the other row are performed during a same period of time.

11. A driving method for a solid state image pickup device according to claim 8, characterized in that a read scanning pulse and an electronic shutter scanning pulse are respectively supplied from the horizontal scanning circuit and the vertical scanning circuit.

12. A driving method for a solid state image pickup device according to claim 11, characterized in that one pulse is supplied for each pixel as the read scanning pulse, one pulse is supplied for each pixel as the electronic shutter scanning pulse, and one of the read scanning pulse and the electronic shutter scanning pulse is supplied such that phases of the read scanning pulse and the electronic shutter scanning pulse do not overlap.

13. A driving method for a solid state image pickup device according to claim 8, wherein a vertical selection switch for reading a signal charge obtained by the pixel in the photoelectric conversion unit to a signal line is controlled by a product of a vertical scanning pulse and a horizontal read pulse, the signal charge read to the signal line is converted into a voltage by a charge detection amplifier connected to said signal line, and a read scanning pulse and an electronic shutter scanning pulse are respectively supplied from the horizontal scanning circuit and the vertical scanning circuit.

14. A driving method for a solid state image pickup device according to claim 13, characterized in that one pulse is supplied for each pixel as the read scanning pulse, one pulse is supplied for each pixel as the electronic shutter scanning pulse, and one of the read scanning pulse and the electronic shutter scanning pulse is supplied such that phases of the read scanning pulse and the electronic shutter scanning pulse do not overlap.

15. A camera, comprising an optical system for focusing incident light on an image pickup region of a solid state image pickup element, an XY address type solid state image pickup element having the image pickup region, a plurality of pixels each provided with a photoelectric conversion unit for producing a signal from the incident light arranged in rows and columns, a drive unit for driving the solid state image pickup element, and a signal processing unit for signal-processing an output signal from the solid state image pickup element to produce a video signal, wherein the drive unit has a horizontal scanning circuit and a vertical scanning circuit, and a reading operation for a signal of a pixel in one row and an electronic shutter operation for a signal of a pixel in another row are carried out by the drive unit and further wherein said solid state image pickup element has a plurality of signal lines, each of said signal lines being used for both said reading operation and said shutter operation and wherein a single signal output line is used for transferring both image output signals and output from the shutter operation for a pixel and further wherein the image output signals and output from the shutter operation for a plurality of pixels pass through a common transistor.

* * * * *